United States Patent
Gschwind et al.

(10) Patent No.: US 7,752,505 B2
(45) Date of Patent: Jul. 6, 2010

(54) METHOD AND APPARATUS FOR DETECTION OF DATA ERRORS IN TAG ARRAYS

(75) Inventors: Michael Gschwind, Chappaqua, NY (US); Michael M. Tsao, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 11/854,887

(22) Filed: Sep. 13, 2007

(65) Prior Publication Data

US 2009/0077425 A1 Mar. 19, 2009

(51) Int. Cl.
*G06F 11/00* (2006.01)
(52) U.S. Cl. ....................................................... 714/52
(58) Field of Classification Search ............. 714/25–30, 714/32, 33, 37–39, 48, 52, 53, 57
See application file for complete search history.

(56) References Cited

U.S. PATENT DOCUMENTS

| | | | | |
|---|---|---|---|---|
| 6,038,693 A | * | 3/2000 | Zhang | 714/768 |
| 6,477,635 B1 | * | 11/2002 | Kahle et al. | 711/210 |
| 6,502,218 B1 | * | 12/2002 | George et al. | 714/805 |
| 6,510,506 B2 | * | 1/2003 | Nagapudi et al. | 711/205 |
| 6,567,952 B1 | * | 5/2003 | Quach et al. | 714/800 |
| 6,772,383 B1 | * | 8/2004 | Quach et al. | 714/746 |
| 6,802,039 B1 | * | 10/2004 | Quach et al. | 714/763 |
| 2002/0087825 A1 | * | 7/2002 | Nagapudi et al. | 711/207 |
| 2006/0168503 A1 | * | 7/2006 | Schroeder et al. | 714/798 |
| 2007/0044003 A1 | * | 2/2007 | Doweck et al. | 714/763 |
| 2009/0019306 A1 | * | 1/2009 | Hum et al. | 714/2 |

* cited by examiner

*Primary Examiner*—Nadeem Iqbal

(57) ABSTRACT

A method for detecting errors in a tag array includes accessing the tag array with an index, retrieving at least one tag from the tag array, and computing a parity bit based on the expected tag.

20 Claims, 5 Drawing Sheets

METHOD AND APPARATUS FOR DETECTION OF DATA ERRORS IN TAG ARRAYS

BACKGROUND

1. Technical Field

The present disclosure relates to detection and handling of data errors and, more specifically, to detection of data errors in tag arrays.

2. Description of Related Art

Data errors in arrays ("soft errors") are occurring increasingly in response to shrinking feature sizes and lower operating voltage. Typically, data can be protected by error detection and error correction codes. Error detection and correction of the error maintains data integrity. Specifically, an error detection code can detect when an error has occurred, and indicate data corruption, e.g., to handle with a higher level mechanism. A common error detection code is the known parity code. Error correction codes can be used to reconstruct the data prior to the error occurring. Typically, error correction codes also are used to detect an error. A common error correction code is the known ECC code.

For parity error handling, a stream of input data is broken up into blocks of bits and the number of 1 bit is counted. Then, for example, a parity bit is set if the number of one bits is odd and cleared if the number of 1 bit is even. If tested blocks overlap, the parity bits can be used to isolate the error and correct it if the error affects a single bit.

Systems for parity error handling are typically high overhead, high logic complexity solutions, or introduce additional delay, where any logic delay slows down the entire system performance.

Tag arrays, e.g., 103, are typically used in cache systems to select between multiple elements in an equivalence set, i.e., the set of lines with a common cache index. Tag arrays are particularly vulnerable to data errors, as their outputs are usually time critical and used for data selection circuits (multiplexers, e.g., 105 in FIG. 1). Furthermore, data selection logic may pose a requirement on tag match logic (e.g., 106-107 in FIG. 1) to produce one-hot encoded select signals, i.e., wherein only one input is selected by a bit vector wherein each bit corresponds to a single input to the selection circuit, and wherein exactly one bit is set to a logic "1" value to indicate the selection of the corresponding data source.

Tag match may naturally result in one-hot outputs, because the same tag cannot be present twice in a given equivalence set, as each data element can be stored at most once (i.e., "synonyms", duplicate tags in an equivalence set, are commonly not allowed). Alas, a data error can cause two tags to match contemporaneously, leading to logic and potentially electric issues in the data selection circuit. This may require enforcing one hot encoding, where only one selection bit is asserted, using additional logic inserted in a critical path, i.e., a path where any logic delay slows down the entire system performance.

In the past, some designs have operated with unprotected tag arrays, as tag arrays were sufficiently small to not pose a significant risk. However, with smaller feature sizes, the frequency of soft error rates increases, and this problem must be addressed for all arrays.

Parity checking (e.g., see 104 in FIG. 1) is often in a critical path, or recovery is difficult if speculatively assumed that no errors have occurred because of a need to undo all state changes based on speculative assumption that there is no parity error. A number of solutions have been introduced.

In one system, on any parity error in any array, there is a signal to the recovery-unit which initiates in the test logic to clear out all the arrays.

Given that not all processor core designs implement a recovery-unit, this is not a general solution.

Specifically, this solution is not applicable to designs without a recovery unit.

Also, stopping an Instruction Fetch Address Register (IFAR) 101, clearing the arrays 102-103, and restarting is typically performed using additional logic and degrades performance in the presence of soft errors, which are increasing in frequency with the small feature sizes (see FIG. 1).

Therefore, a need exists for a method to efficiently control a data selection circuits in response to tag arrays lookups and tag match logic, while avoiding synonyms introduced by data errors in a tag array.

SUMMARY

According to an embodiment of the present disclosure, a method for detecting errors in a tag array includes determining an expected tag, determining an expected error detection code, based on the expected tag, corresponding to an indication of an absence of error, retrieving a tag and a corresponding error detection code from the tag array, comparing the expected tag and the expected error detection code with the tag and the corresponding error detection code from the tag array, and indicating a miss when a tag mis-match is detected directly responsive to the comparison of the expected tag and the expected error detection code with the tag and the corresponding error detection code from the tag array.

According to an embodiment of the present disclosure, an apparatus for detecting errors in a tag array includes an effective address directory device storing the tag array and instruction cache, the effective address directory device comprising, logic for determining an expected tag, logic for determining an expected error detection code, based on the expected tag, corresponding to an indication of an absence of error, logic for retrieving a tag and a corresponding error detection code from the tag array. The apparatus further including a multiplexer device in communication with the effective address directory device for comparing the expected tag and the expected error detection code with the tag and the corresponding error detection code from the tag array.

According to an embodiment of the present disclosure, a semiconductor device for detecting errors in a tag array including an effective address directory device storing the tag array and instruction cache, the effective address directory device comprising, logic for determining an expected tag, logic for determining an expected error detection code, based on the expected tag, corresponding to an indication of an absence of error, logic for retrieving a tag and a corresponding error detection code from the tag array. The semiconductor device further including a multiplexer device in communication with the effective address directory device for comparing the expected tag and the expected error detection code with the tag and the corresponding error detection code from the tag array.

BRIEF DESCRIPTION OF THE DRAWINGS

Preferred embodiments of the present disclosure will be described below in more detail, with reference to the accompanying drawings.

DETAILED DESCRIPTION OF EXEMPLARY EMBODIMENTS

According to an exemplary embodiment of the present disclosure, a method for detecting data errors is based on an effective address directory with parity check. An effective address directory is a tag array based on a Power Architecture effective address for a first level instruction cache to select from a plurality of lines in an equivalence set. Those skilled in the art will understand how to apply the teachings contained herein to other tag arrays, and to other detection codes (and including the ability to detect errors with correction codes) within the scope of the invention.

According to an exemplary embodiment of the present invention, Effective Address Directory (EADIR) is a part of access in instruction cache, and is used in conjunction with a one-hot way select multiplexer control. The one-hot way select multiplexer (mux) control is used to substantially prevent corruption (way1 AND select1) OR (way0 AND select0). In an exemplary embodiment, this is achieved by avoiding multiple similar tag entries for an equivalence set. This is achieved automatically for full width tags, wherein each line can only be present in a cache at most once, or by avoiding "synonyms" when partial tags are used, wherein not all address bits are used to identify a block. Synonyms are false tag matches due to the partial tag structure used in an EADIR. An EADIR may be used in conjunction with a physical address instruction cache directory (IDIR), which provides full (physical) tag check capability where said EADIR is used to steer way select mux for instruction array access and optionally IDIR access.

Data errors can corrupt the "synonym-free" nature of tags needed on EADIR and lead to incorrect execution. Here a method is implemented to steer a way-selection mux from EADIR, while avoiding synonyms introduced by parity errors. What is further needed is a solution which does not introduce additional delay. What is further needed is a solution which allows efficient recovery in scenarios where party errors have been detected in the EADIR.

According to an embodiment of the present invention, the EADIR includes a tag array (storing tag and additional info such as valid bit), parity compute logic, tag and parity compare logic.

According to an embodiment of the present invention, when a tag match is launched, a tag parity precompute operation is initiated, and the precomputed parity of the match-tag is compared with the parity of the tag stored in data array.

Figure 1:
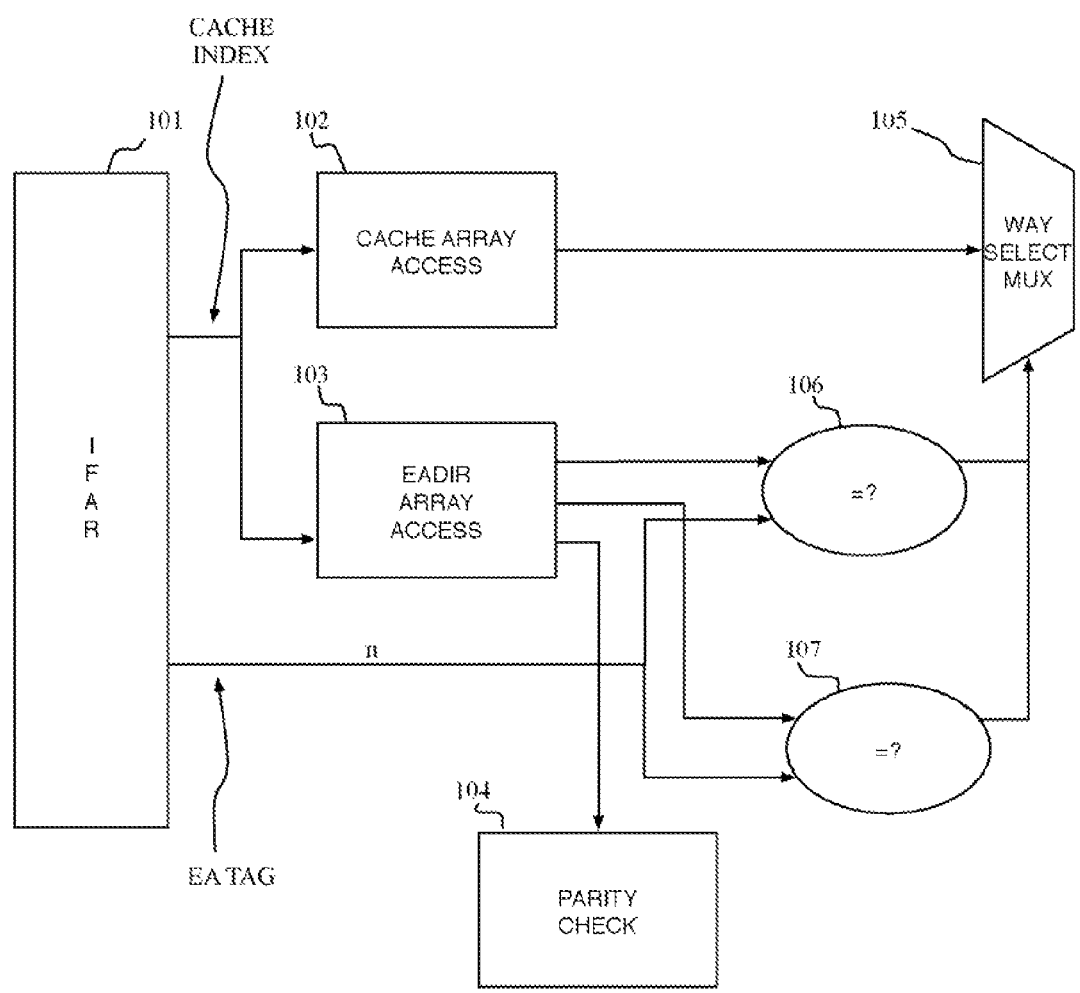
FIG. 1 of a system and apparatus for parity bit handling.
Figure 2:
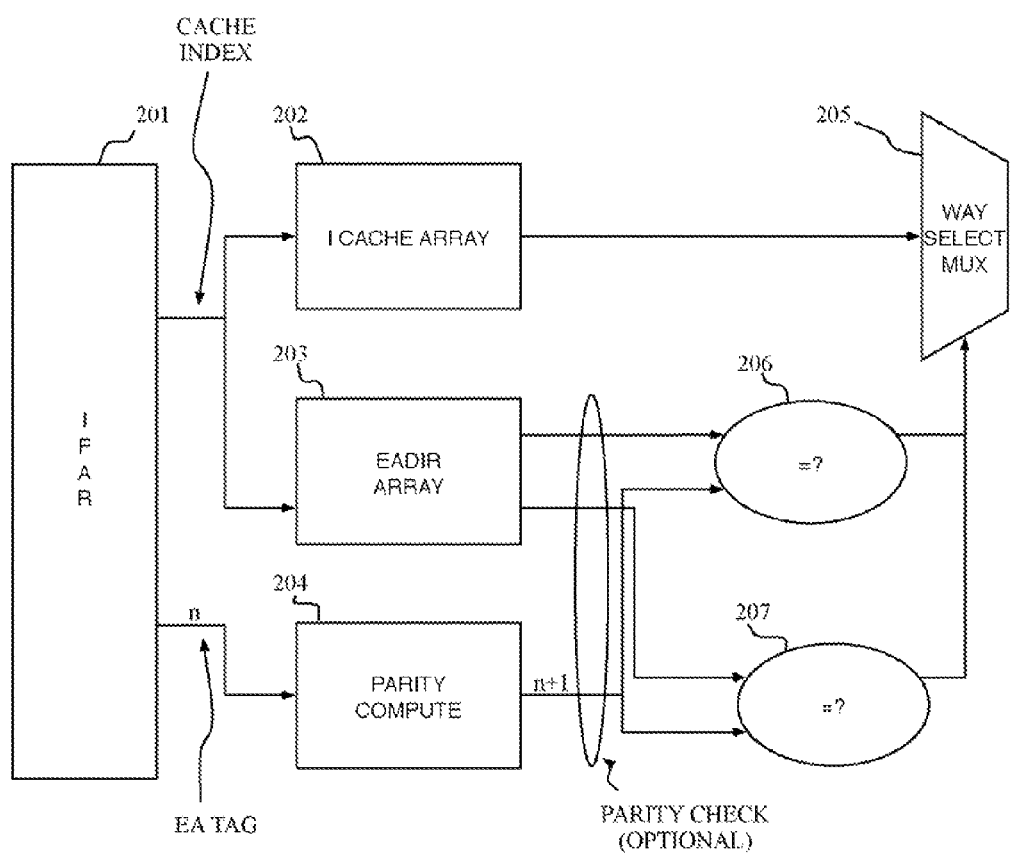
FIG. 2 of a system and apparatus for parity bit handling according to an embodiment of the present disclosure.

Referring to FIG. 2, there is shown a system and apparatus for an exemplary embodiment of the present invention. An Instruction Fetch Address Register (IFAR) 201 holds the Effective Address (EA) of the current instruction. The instruction cache look up operation checks whether the instruction corresponding to this address is stored in the Instruction Cache (I-Cache) 202 and return the referenced instruction or group of instructions by way of multiplexer 205 for execution by the processor.

A portion of the IFAR (instruction fetch address register) address bits are used as the I-cache Index. A different portion, of n bits, is used as the Effective Address Directory TAG (EA TAG).

The I Cache Index is used to look up (access) the I-Cache array 202 and the EADIR array 203. The output of the EADIR is compared with the EA TAG, by the two comparators 206-207, to determine the setting of the I-Cache output multiplexer 205.

According to an embodiment of the present invention, the EA TAG parity is also determined 204 prior to the EA Dir TAG compare.

In a preferred embodiment, the generation of parity corresponding to the tag being used to perform a lookup is done in parallel to the EADIR array access. In yet another embodiment, parity generation is performed prior to the IFAR register update, and the parity value, or other such error detection or correction code, is stored in conjunction with the IFAR value. In yet another embodiment, storing of an error detection code in conjunction with the IFAR can also be used to protect the IFAR from soft errors, and detect when such errors occur.

There may be additional checking present to indicate when parity mismatch has occurred, e.g., by comparing the precomputed parity bit with the parity bit stored in the array and to take additional corrective actions, perform recording and tracking of data integrity errors, and so forth, responsive to occurrence of said data integrity errors.

Referring now to parity error handling, in one embodiment a combined reload and deletion mechanism is used. In accordance with a preferred embodiment of a parity handling method (or other such error detection code-based data error detection recovery), a first set of parity errors is resolved using the cache miss and reload mechanism. An additional mechanism is employed to recover from scenarios wherein the cache reload mechanism is not sufficient, with said additional backup mechanism used to delete entries which are corrupt.

EADIR parity error handling may be implemented wherein part of the instruction cache block invalidate logic (ICBI) logic commonly found in Power Architecture and other processors is used and all entries are selected of the appropriate index are deleted. The offending index (ICBI might be engaged and is higher priority) is queued, with one request per thread; the IFAR is held; entries of the corresponding index are deleted; and the instruction fetch using the IFAR is restarted.

The control logic for instruction cache block invalidation needs to synchronize between ICBIs, pseudo-ICBIs injected for parity handling, and parity-error handling for multiple threads (when multiple data errors are found. Cache index values to be invalidated may need to be queued for said multiple threads suffering coincident data errors).

According to an embodiment of the present invention, an EADIR includes a tag array storing tag and additional info such as valid bit, parity compute logic, tag and parity compare logic.

According to an embodiment of the present invention, when a tag match is launched, a tag parity precompute operation is initiated 301/401, and the precomputed parity of the match-tag is compared with the parity of the tag stored in data array (303/403). The stored tag and parity are retrieved from the EADIR array (302/402).

The cost is the delay for precomputing parity, and an additional 1 bit of input on the comparison logic to include the parity indication. The precomputing (301/401) may be performed in parallel with data access (302/402), as tags are only compared after access, and hence may not involve any latency penalty from IFAR-initiated cache access to data availability.

When (stored entry & stored parity) is equal to (desired tag & parity desired tag parity), a successful tag match has occurred. Tag entries with a parity error can never result in a match for this equation because a correct parity will mismatch with incorrect parity. Thus, tags with a parity error automatically result in a miss in accordance with the present invention wherein precomputed parity bits are included in a tag match check to ensure data integrity.

To expedite aging out of entries with a parity error from a tag array, the cache replacement selection is biased to wipe out entries with the following priority:
synonyms
parity errors
Least Recently Used (LRU)

Entries with parity errors do not enter the equation in selecting a way (because they necessarily result in a non-match), and so all the issues with EADIR parity handling (for example, non-one hot encoded input to I-Cache way-select mux, etc.) do not need to be considered. The parity of the desired tag is available only after the desired tag has been computed, because it needs to be passed through the parity compute logic. Additionally, the tag comparator requires an additional bit to include the parity in the match function.

Computing a parity in parallel with a tag access is faster in terms of total latency than computing the parity after the array access; since the tag with precomputed parity bit is needed only after the index-based access to the tag array, and can be computed in parallel to the array access.

In another embodiment, one or more parity bits are stored in conjunction with an IFAR register, and no precompute is necessary. Said parity bits can further be used to protect the IFAR register against data corruption.

In accordance with an embodiment of the present invention, a high performance solution offers both less logic delay in checking data correctness, and reduces a performance penalty due to instruction cache invalidation of the entire cache as used in conjunction with prior art. This exemplary solution is also a complexity-effective solution with a reduced amount of control logic complexity.

This exemplary solution does not protect the valid bits in the simplest form. The valid bits as part of parity cannot be pre-computed as the setting is unknown, although this could be made a late term.

In a preferred embodiment, valid bits are duplicated to protect valid bits from corruption. In one embodiment, duplication is performed with opposite polarity of the duplicated bit, i.e., when said duplicated bit is 0 a 1 is stored in the duplicate bit, and vice versa.

According to an embodiment of the present invention, the instruction cache does not need to be flushed on parity as used in conjunction with prior art, leading to a better performance in the presence of soft errors, which is an important consideration as soft error rates increase.

Figure 3:
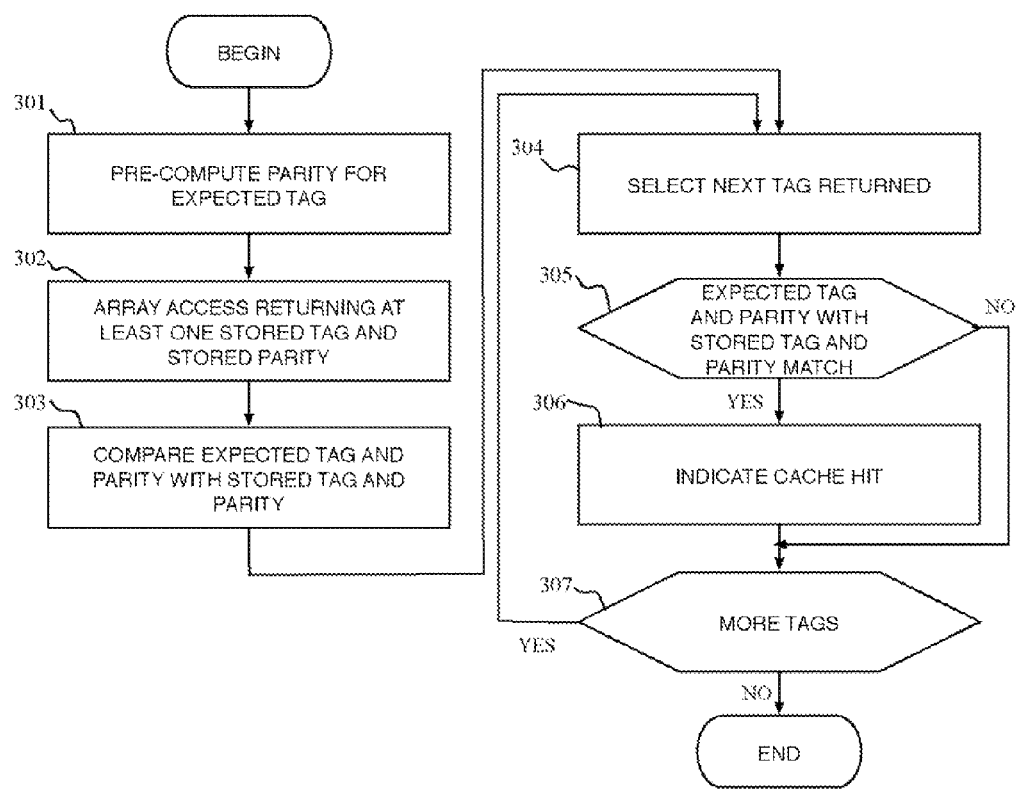
FIG. 3 is a flow diagram of a method for parity bit handling according to an embodiment of the present disclosure.

Referring now to FIG. 3, there is shown an exemplary method for pre-computing a parity bit in conjunction with the present invention. At block 301 the parity for an expected tag is pre-computed. An array access returns at least one stored tag and stored parity 302. The expected tag and parity are compared to the stored tag and stored parity 303. At block 304 a tag is returned is selected. If the expected tag and parity match with the stored tag and stored parity at block 305, a cache hit is indicated 306 and control passes to block 307. If there is no match, control transfers directly to block 307. In block 307, it is determined whether there are additional tags 307. If additional tags exit, control passes to block 304. Otherwise, the method completes.

Figure 4:
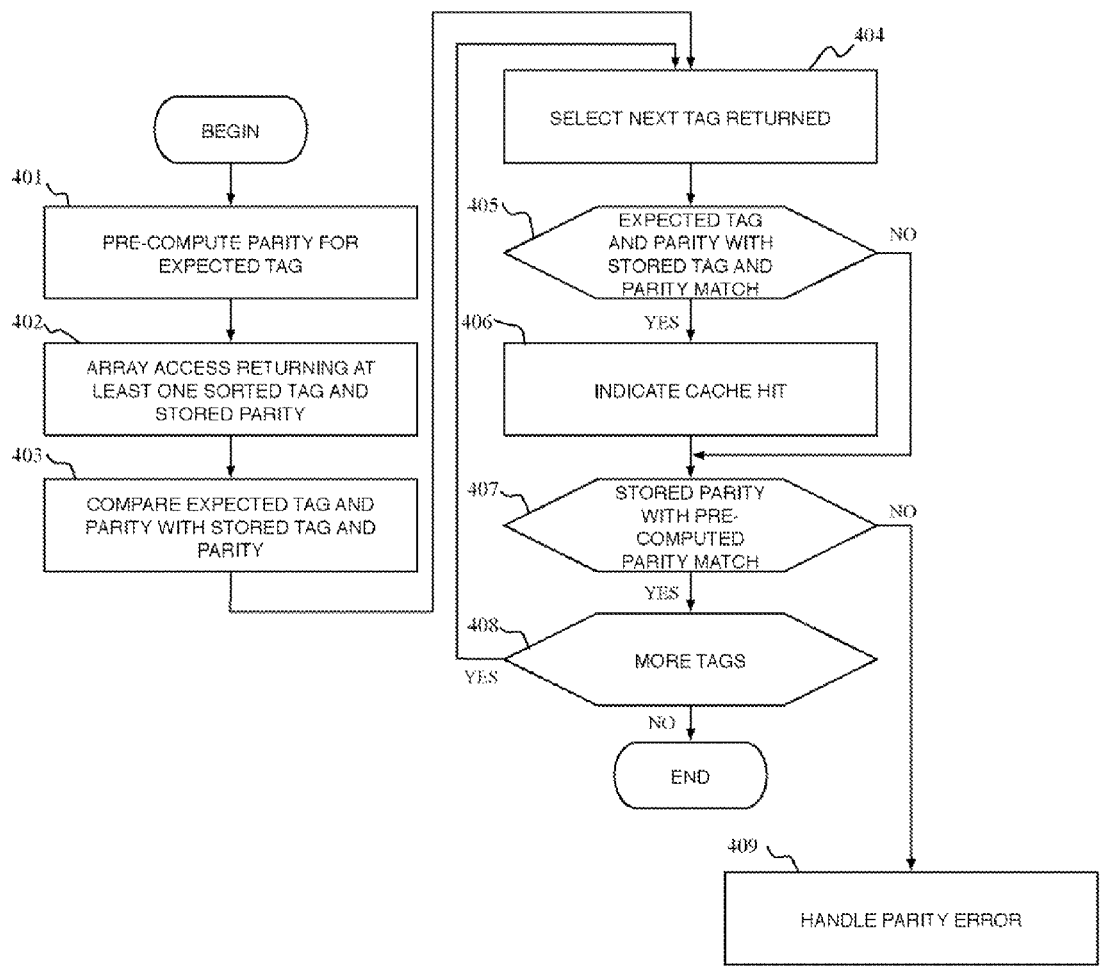
FIG. 4 is a flow diagram of a method for parity bit handling according to an embodiment of the present disclosure.

Referring now to FIG. 4, there is shown an exemplary method to pre-compute a parity bit in conjunction with the present invention. At block 401 the parity for an expected tag is pre-computed. An array access returns at least one stored tag and stored parity 402. The expected tag and parity are compared to the stored tag and stored parity 403. At block 404 a tag is returned is selected. If the expected tag and parity match with the stored tag and stored parity at block 405 a cache hit is indicated 406, and control passes to block 407. If there is no match, control transfers directly to block 407. In block 407, a check for parity errors is performed. If no parity error is at block 407, the method continues for the remaining tags 408, otherwise a parity error is handled at block 409.

Those skilled in the art will contemplate that FIGS. 3 and 4 can be performed with error detection codes other than parity code within the scope of the present invention.

Exemplary recovery scenarios are presented below wherein the EADIR hit/miss indication corresponds to hit miss incorporating matching on a predictively computed error detection code against a stored error detection code. In the exemplary embodiment, parity coding is used as a parity detection code, but those skilled in the art will understand how to apply the teachings contained herein to other error detection codes:

1. No EADIR hit indicated (blocks 306/406 preferably implemented by comparators 206 and 207), one way (way0 or way1) has parity error (blocks 303/403). The entry with parity error could correspond to the desired tag prior to tag corruption due to a data error (soft error).

In accordance with an exemplary embodiment, a cache miss is processed and a line reloaded to the instruction cache.

Preferably, the replacement policy chooses the corrupt entry for replacement, to evict corrupt entries from the cache and/or retain useful data.

However, if the missing data corresponds to a synonym for the non-corrupt data, the synonym must be overwritten to avoid duplicate hits on synonyms in the cache. In one embodiment, instruction cache block invalidation logic is used in this case to invalidate the corrupt entry.

2. No EADIR hit (from block 306/406 preferably implemented by comparators 206 and 207), both ways (or several ways, in a more than 2-way cache configuration) have parity error (from block 303/403). One of the two ways could have been an actual tag match before data corruption, but due to corrupted tag it not longer is a match.

Corrective action includes a reload (from block 304/404). Where corrupt PE entries in EADIR are not tolerated, then both EADIR entries are deleted (block 409).

In one embodiment, instruction cache block invalidation logic is used in this case to invalidate at least one corrupt entry.

3. EADIR hit on one way (from block 306/406), but the way which hits has PE. While this scenario could occur in tag-match systems according to prior art, this scenario is advantageously prevented by the current invention.

4. EADIR hit in one cache way (from block 306/406). However, another way which does not match the lookup tag has a Parity Error. Due to the parity check being included in tag match, the way with parity error cannot be selected, thereby ensuring correct execution.

In at least one embodiment, when lines with parity errors are proactively invalidated and evicted from the cache, the line with parity error is invalidated. In one embodiment, invalidation occurs using the instruction cache block invalidation logic.

5. EADIR hit on both ways (from block 306/406), one way has a parity error. While this scenario could occur in tag-match systems according to prior art, this scenario is advantageously prevented by the current invention.

6. EADIR hit on both ways (from block 306/406), both ways have a parity error. While this scenario could occur in tag-match systems according to prior art, this scenario is advantageously prevented by the current invention.

In at least one embodiment, whenever a parity error (or other such error detection code mismatch) is detected, at least one array will be exhaustively checked for soft errors, by reading every entry, checking for errors, and correcting errors when possible ("cache scrubbing"). Typically, said at least one array will correspond to at least the array exhibiting said parity error, although other caches can be checked simultaneously.

In one embodiment, the cache scrubbing is performed in the background, while the microprocessor continues to operate.

While the present invention has been described with reference to an exemplary embodiment based on an effective address direction, those skilled in the art will understand how to apply the teachings contained herein to other tag array structures, such as an instruction cache directory (IDIR), data cache directory (DDIR), translation lookaside buffer (TLB), or effective to real address translation table (ERAT).

Furthermore, the teachings contained herein make reference to a 2-way cache structure in an exemplary fashion. Those skilled in the art will understand how to apply the teaching contained herein to caching structures with tag arrays having other than 2 ways, such as an n-way cache organization, wherein n can be any natural number, such as 1, 2, 3, 4, or other such number.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 5:
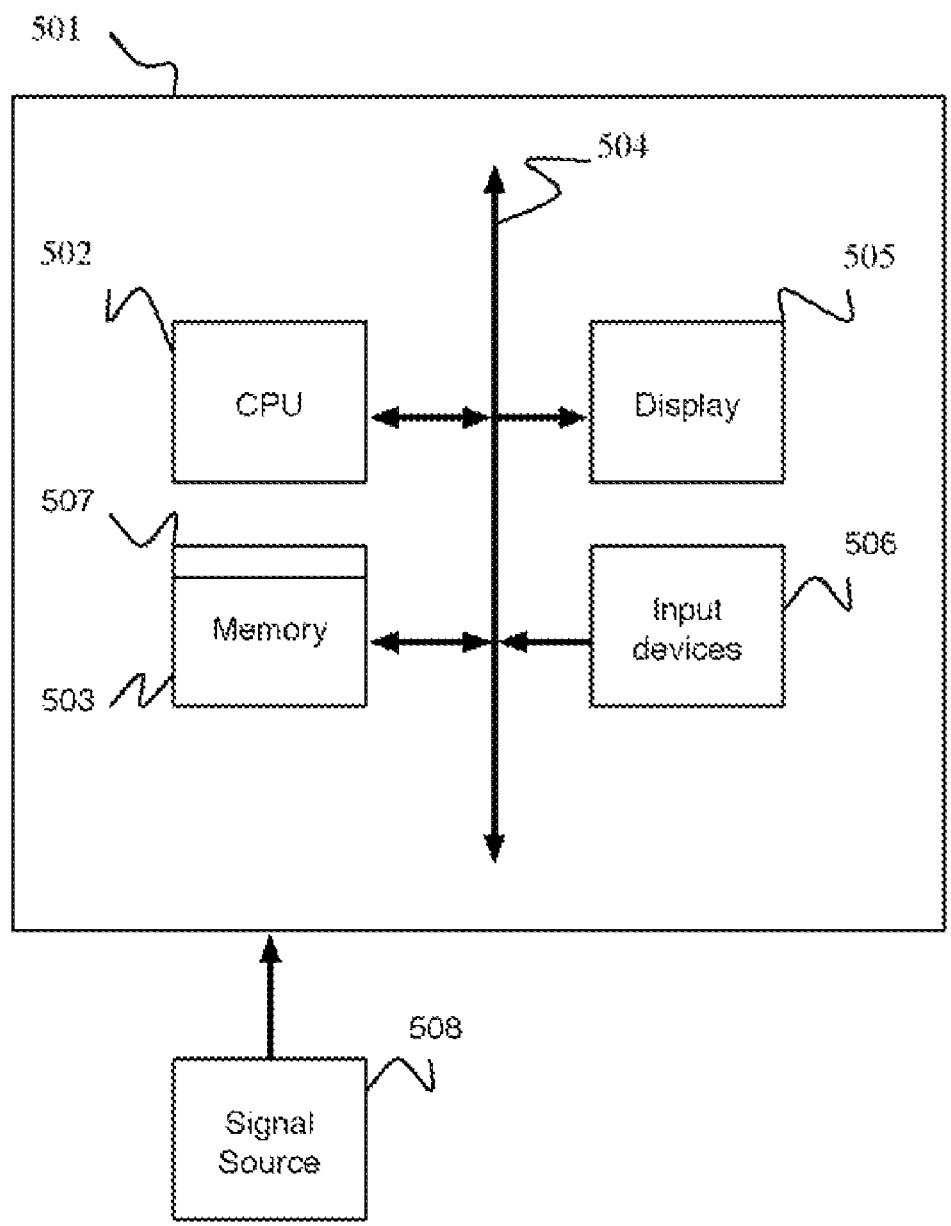
FIG. 5 is diagram of a system according to an embodiment of the present disclosure.

Referring to FIG. 5, according to an embodiment of the present invention, a computer system 501 for two-dimensional memory caching for video data can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include random access memory (RAM), read only memory (ROM), disk drive, tape drive, or a combination thereof. The present invention can be implemented as a routine 507 that is stored in memory 503 and executed by the CPU 502 to process the signal from the signal source 508. As such, the computer system 501 is a general-purpose computer system that becomes a specific-purpose computer system when executing the routine 507 of the present invention.

The computer platform 501 also includes an operating system and micro instruction code. The various processes and functions described herein may either be part of the micro instruction code, or part of the application program (or a combination thereof) which is executed via the operating system. In addition, various other peripheral devices may be connected to the computer platform such as an additional data storage device and a printing device.

It is to be further understood that, because some of the constituent system components and methods depicted in the accompanying figures may be implemented in software, the actual connections between the system components (or the processes) may differ depending upon the manner in which the present invention is programmed. Given the teachings of the present invention provided herein, one of ordinary skill in the related art will be able to contemplate these and similar implementations or configurations of the present invention.

Having described embodiments for a system and method for two-dimensional memory caching for video data, it is noted that modifications and variations can be made by persons skilled in the art in light of the above teachings. It is therefore to be understood that changes may be made in the particular embodiments of the invention disclosed which are within the scope and spirit of the disclosure.

What is claimed is:

1. A computer-implemented method for detecting errors in a tag array, the method steps comprising:
   determining an expected tag;
   determining an expected error detection code, based on the expected tag, corresponding to an indication of an absence of error;
   retrieving a tag and a corresponding error detection code from the tag array;
   comparing the expected tag and the expected error detection code with the tag and the corresponding error detection code from the tag array; and
   indicating a miss when a tag mis-match is detected directly responsive to the comparison of the expected tag and the expected error detection code with the tag and the corresponding error detection code from the tag array.

2. The method of claim 1, wherein error handling logic is triggered when the expected error detection code does not match the error detection code from the tag array.

3. The method of claim 1, wherein the miss is indicated when one of a tag mismatch and an error detection code mismatch is detected.

4. The method of claim 1, wherein the expected error detection code corresponding to the indication of the absence of error is determined in parallel with an array access for retrieving the tag and the corresponding error detection code from the tag array.

5. The method of claim 1, wherein the expected error detection code corresponding to the indication of the absence of error is determined when an instruction fetch address register is to be updated.

6. The method of claim 5, wherein the expected error detection code, stored in conjunction with an instruction fetch address register value, protects contents of the instruction fetch address register from a soft error.

7. The method of claim 1, triggering a cache scrubbing upon detecting a data corruption scenario.

8. The method of claim 1, wherein when a data corruption is detected, a replacement policy is overridden, and a reload occurs at a specific cache block containing the data corruption.

9. The method of claim 8, wherein the overriding is not performed when a synonym condition is to be avoided.

10. The method of claim 9, wherein an instruction cache block invalidation logic invalidates a cache block containing the data corruption, when the data corruption cannot be overwritten with the reload due to the synonym condition.

11. The method of claim 1, wherein valid bits are duplicated.

12. The method of claim 11, wherein a second copy of the valid bits has an opposite polarity of a first copy of the valid bits.

13. The method of claim 1, wherein the tag array corresponds to an effective address directory.

14. The method of claim 1, wherein tag array corresponds to an instruction cache directory.

15. The method of claim 1, wherein tag array corresponds to one of a translation look-a-side buffer and an effective-to-real-address-translator.

16. The method of claim 1, wherein multiple cache lines are invalidated by instruction cache block invalidation logic in response to coincident detection of multiple cache blocks with data corruption.

17. The method of claim 1 wherein the error detection code corresponds to one of a parity code and an error correction code.

18. An apparatus for detecting errors in a tag array comprising:
- an effective address directory device storing the tag array and instruction cache, the effective address directory device comprising,
    - logic for determining an expected tag,
    - logic for determining an expected error detection code, based on the expected tag, corresponding to an indication of an absence of error,
    - logic for retrieving a tag and a corresponding error detection code from the tag array; and
- a multiplexer device in communication with the effective address directory device for comparing the expected tag and the expected error detection code with the tag and the corresponding error detection code from the tag array.

19. A semiconductor device for detecting errors in a tag array comprising:
- an effective address directory device storing the tag array and instruction cache, the effective address directory device comprising,
    - logic for determining an expected tag,
    - logic for determining an expected error detection code, based on the expected tag, corresponding to an indication of an absence of error,
    - logic for retrieving a tag and a corresponding error detection code from the tag array; and
- a multiplexer device in communication with the effective address directory device for comparing the expected tag and the expected error detection code with the tag and the corresponding error detection code from the tag array.

20. A computer readable medium embodying instructions executable by a processor to perform a method for detecting errors in a tag array, the method steps comprising:
- determining an expected tag;
- determining an expected error detection code, based on the expected tag, corresponding to an indication of an absence of error;
- retrieving a tag and a corresponding error detection code from the tag array;
- comparing the expected tag and the expected error detection code with the tag and the corresponding error detection code from the tag array; and
- indicating a miss when a tag mis-match is detected directly responsive to the comparison of the expected tag and the expected error detection code with the tag and the corresponding error detection code from the tag array.

* * * * *